United States Patent
Husted et al.

(10) Patent No.: US 8,897,280 B2
(45) Date of Patent: Nov. 25, 2014

(54) SYSTEM AND METHOD FOR CLEAR CHANNEL ASSESSMENT THAT SUPPORTS SIMULTANEOUS TRANSMISSION BY MULTIPLE WIRELESS PROTOCOLS

(75) Inventors: Paul J. Husted, San Jose, CA (US); Olaf J. Hirsch, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 514 days.

(21) Appl. No.: 13/074,278

(22) Filed: Mar. 29, 2011

(65) Prior Publication Data
US 2012/0250532 A1 Oct. 4, 2012

(51) Int. Cl.
H04W 4/00 (2009.01)
H04L 12/413 (2006.01)
H04W 74/08 (2009.01)
H04W 88/06 (2009.01)

(52) U.S. Cl.
CPC .......... *H04W 74/0808* (2013.01); *H04W 88/06* (2013.01)
USPC ............................. 370/338; 370/445; 455/434

(58) Field of Classification Search
None
See application file for complete search history.

(56) References Cited

U.S. PATENT DOCUMENTS

| | | | | |
|---|---|---|---|---|
| 7,333,830 | B2* | 2/2008 | Malone ...................... | 455/552.1 |
| 7,363,046 | B2 | 4/2008 | Beecher | |
| 7,653,038 | B2 | 1/2010 | Chung et al. | |
| 7,672,328 | B2 | 3/2010 | Konradsson et al. | |
| 8,441,971 | B2* | 5/2013 | Tanach ......................... | 370/311 |
| 8,634,317 | B1* | 1/2014 | Yu ................................ | 370/252 |
| 2002/0136183 | A1* | 9/2002 | Chen et al. ................... | 370/338 |
| 2003/0054827 | A1 | 3/2003 | Schmidl et al. | |
| 2007/0060155 | A1* | 3/2007 | Kahana et al. ................ | 455/450 |
| 2007/0133473 | A1* | 6/2007 | Takagi et al. ................. | 370/334 |
| 2007/0232349 | A1 | 10/2007 | Jones et al. | |
| 2007/0274273 | A1 | 11/2007 | Grushkevich et al. | |
| 2007/0280332 | A1 | 12/2007 | Srikanteswara et al. | |
| 2007/0286122 | A1* | 12/2007 | Fonseca ........................ | 370/329 |
| 2008/0008133 | A1 | 1/2008 | Zhu et al. | |
| 2008/0279138 | A1 | 11/2008 | Gonikberg et al. | |
| 2009/0052574 | A1* | 2/2009 | Li et al. ........................ | 375/296 |
| 2009/0097445 | A1 | 4/2009 | Moelker et al. | |
| 2009/0129353 | A1* | 5/2009 | Ki et al. ....................... | 370/338 |
| 2009/0149135 | A1 | 6/2009 | Mangold et al. | |
| 2009/0207747 | A1 | 8/2009 | Kim et al. | |
| 2009/0323652 | A1 | 12/2009 | Chen et al. | |

(Continued)

OTHER PUBLICATIONS

International Search Report and Written Opinion—PCT/US2012/029655—ISA/EPO—May 22, 2012.

*Primary Examiner* — Anh-Vu Ly
(74) *Attorney, Agent, or Firm* — Bay Area Technology Law Group PC

(57) ABSTRACT

System and method for performing clear channel assessment for simultaneous transmission in a device implementing multiple wireless protocols. The system may include first and second wireless protocol circuitry configured to generate first and second signals, respectively, for wireless transmission according to first and second wireless protocols, respectively. A first in-band signal strength threshold and a second in-band signal strength threshold may be maintained by the first wireless protocol circuitry. It may be determined whether the first or second in-band signal strength threshold should be used in performing the clear channel assessment. Clear channel assessment may be performed using the determined in-band signal strength threshold. Performing clear channel assessment may include comparing an ambient signal strength on a channel with the determined in-band signal strength threshold. The first wireless protocol circuitry may be configured to determine whether to wirelessly transmit first signals based on the clear channel assessment.

20 Claims, 3 Drawing Sheets

(56) References Cited

U.S. PATENT DOCUMENTS

2012/0095311 A1* 4/2012 Ramey et al. .............. 600/365
2012/0224484 A1* 9/2012 Babiarz et al. ............. 370/235
2013/0115941 A1* 5/2013 Banerjea et al. ........... 455/426.1
2013/0258989 A1* 10/2013 Ribeiro et al. ............. 370/329
2013/0272260 A1* 10/2013 Bitran et al. ............... 370/329
2014/0029535 A1* 1/2014 Medapalli ................... 370/329

* cited by examiner

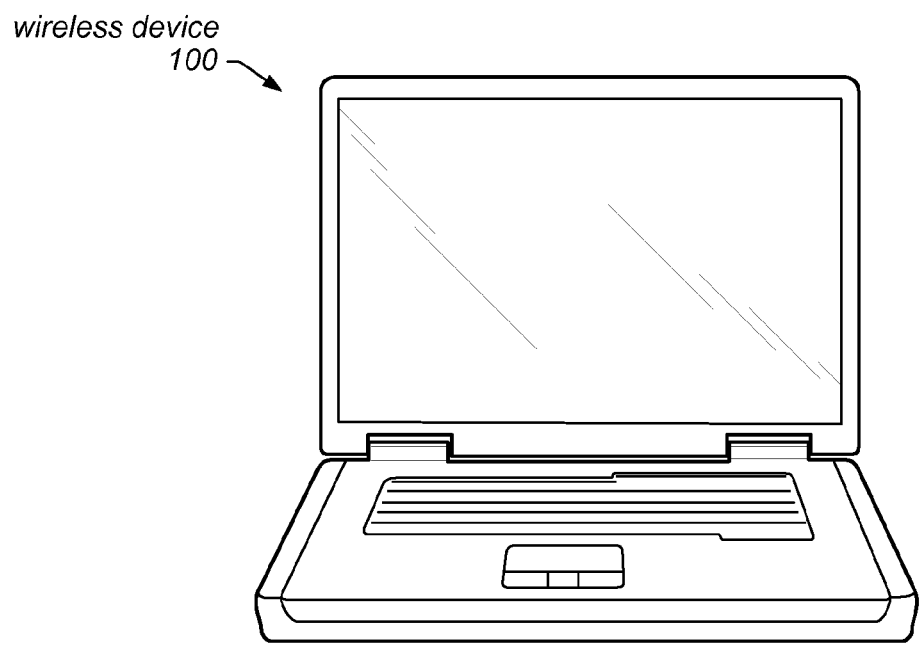
FIG. 1A
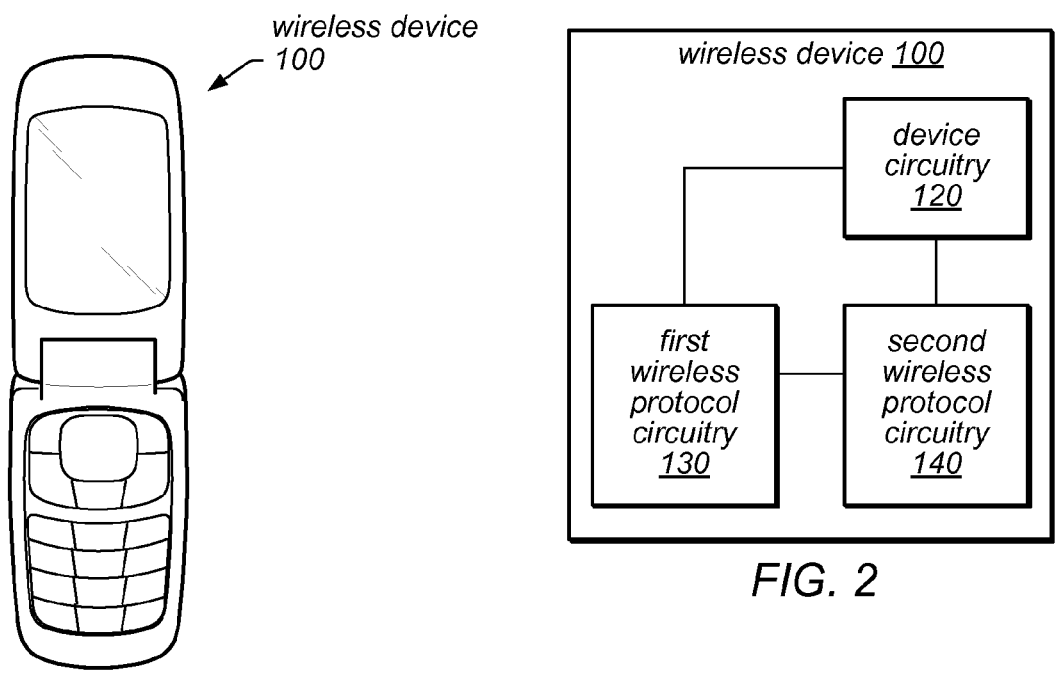
FIG. 1B
FIG. 2

SYSTEM AND METHOD FOR CLEAR CHANNEL ASSESSMENT THAT SUPPORTS SIMULTANEOUS TRANSMISSION BY MULTIPLE WIRELESS PROTOCOLS

BACKGROUND

1. Field of the Disclosure

The present invention relates generally to wireless communication, and more particularly to a system and method for performing clear channel assessment that supports simultaneous transmission by multiple wireless protocols in a wireless device.

2. Description of the Related Art

Wireless communication is being used for a plethora of applications, such as in laptops, cell phones, and other wireless communication devices ("wireless devices"). In fact, wireless communication is becoming so widely used, it is common for wireless devices to be able to communicate using a plurality of different wireless communication protocols. Accordingly, it is common for a wireless device to have different circuit portions that implement different wireless protocols.

Some common wireless protocols, such as 802.11 (WLAN) and Bluetooth, share radio frequency bands. This may give rise to a number of concerns for a device implementing multiple such wireless protocols. For example, even though transmission using the different wireless protocols may be performed using different frequencies within the band, some transmission energy from a transmission using one or the other wireless protocol may negatively affect use of the other wireless protocol. Accordingly, improvements which address such concerns would be desirable.

SUMMARY OF THE DISCLOSURE

Clear channel assessment is a technique for assessing whether a channel on which a wireless protocol desires to wirelessly transmit signals is clear of other transmissions on the same channel. Clear channel assessment may be particularly desirable in carrier sense multiple access (CSMA) protocols such as WLAN. For example, a WLAN enabled device may be part of a wireless network including a plurality of WLAN enabled devices using a common radio frequency channel to communicate with each other. Clear channel assessment may help avoid transmission collisions between the devices in the WLAN network by determining, based on signal strength in the channel, whether another WLAN device in the network is currently transmitting.

This technique may be straightforward to implement in a device that only implements a single wireless protocol. Difficulties may arise, however, in devices which support multiple wireless protocols. It is possible, for example, for transmissions on frequencies near the channel to have an effect on clear channel assessment. Thus, as one example, if a WLAN enabled device is also enabled with Bluetooth, Bluetooth might transmit on a frequency near enough (e.g., tens of MHz, in some embodiments) to the WLAN channel that some energy from the transmission will be detectable in the channel. This could cause the clear channel assessment to determine that the channel is not clear, and thereby cause WLAN to not transmit, even though the Bluetooth transmission would typically not interfere with reception of the WLAN signals at other WLAN devices in the WLAN network. While WLAN and Bluetooth are used as readily understandable examples of wireless protocols for which this situation may be relevant, it will be understood that this may also be a problem for other wireless protocols.

Accordingly, more advanced clear channel assessment techniques may be required for simultaneous transmission using multiple wireless protocols. Embodiments of the disclosure relate to a system and method for performing clear channel assessment in a wireless device supporting multiple wireless protocols.

The system configured to implement the method may include the entire wireless device or a portion thereof. The wireless device may include first wireless protocol circuitry configured to generate first signals for wireless transmission according to a first wireless protocol. The wireless device may further include second wireless protocol circuitry configured to generate second wireless signals for wireless transmission according to a second wireless protocol. The wireless device may also include one or more antennas; for example, in some embodiments the wireless device may include separate antennas for transmitting first and second signals. The wireless device may further include any of a variety of other components implementing other functionality typical of a wireless device. One set of embodiments relates to a chip for use in the wireless device, which implements the first wireless protocol circuitry and is configured to perform the method. The chip may also include the second wireless protocol circuitry and/or other components. The method may be performed as follows.

A first in-band signal strength threshold and a second in-band signal strength threshold may be maintained. The first and second in-band signal strength thresholds may be maintained by the first wireless protocol circuitry. Maintaining the first and second in-band signal strength thresholds may include establishing and/or modifying values for the first and second in-band signal strength thresholds, and/or storing the first and second in-band signal strength thresholds.

In some embodiments, the first wireless protocol circuitry may receive information regarding transmission strength and/or frequency for second signals being transmitted by the second wireless protocol circuitry. The information may be received from the second wireless protocol circuitry, and/or from another source in the wireless device, and/or the first wireless protocol circuitry may determine the information through empirical measurements.

The first wireless protocol circuitry may modify one or more of the in-band signal strength thresholds based on the received information. For example, in some embodiments, the second in-band signal strength threshold may be modified based on one or more of a difference between transmission frequencies of the first and second wireless protocol circuitries or a transmission strength of second signals by the second wireless protocol circuitry. In some embodiments, a level of isolation between a first antenna (e.g., for transmitting first signals according to the first wireless protocol) and a second antenna (e.g., for transmitting second signals according to the second wireless protocol) may also be used in establishing and/or modifying the second in-band signal strength threshold.

In some embodiments, the second in-band signal strength threshold may be maintained (e.g., in any of the ways described above) at a value which is configured to be higher than a signal strength value of second signals present on the channel to be assessed during transmission of second signals by the wireless device.

It may be determined whether the first or second in-band signal strength threshold should be used in performing clear channel assessment. The determination may be made by the first wireless protocol circuitry. In some embodiments the first wireless protocol circuitry may receive an indication that the second wireless protocol circuitry is wirelessly transmitting second signals (e.g., when the second wireless protocol circuitry is wirelessly transmitting second signals). The determination may be based on whether the indication that the second wireless protocol circuitry is wirelessly transmitting second signals is received. For example, if an indication is received that the second wireless protocol circuitry is wirelessly transmitting second signals, it may be determined that the second in-band signal strength threshold should be used in performing clear channel assessment. If no indication that the second wireless protocol circuitry is wirelessly transmitting second signals is received (or, alternatively, if an indication is received that the second wireless protocol circuitry is not wirelessly transmitting second signals), it may be determined that the first in-band signal strength threshold should be used in performing clear channel assessment.

Alternatively, or in addition, the determination may include determining how frequently first and/or second signals are being transmitted, and/or determining typical signal strengths of the first signals and/or second signals in a channel (e.g., the channel for which clear channel assessment will be performed). In some embodiments, the determination may also be based on a level of isolation between the first and second antennas. For example, if second signals are being transmitted relatively infrequently and/or with relatively low signal strength (e.g., present in the channel to be assessed), it may be determined that the first in-band signal strength threshold should be used in performing clear channel assessment. On the other hand, if second signals are being transmitted relatively frequently and/or with relatively high signal strength (e.g., present in the channel to be assessed), it may be determined that the second in-band signal strength threshold should be used in performing clear channel assessment.

Clear channel assessment may then be performed using the determined in-band signal strength threshold. Performing clear channel assessment may include comparing an ambient signal strength on the channel being assessed with the determined in-band signal strength threshold. The first wireless protocol circuitry may perform the clear channel assessment. The first wireless protocol circuitry may further be configured to determine whether to wirelessly transmit first signals based on the clear channel assessment. For example, if the ambient signal strength on the channel is higher than the determined in-band signal strength threshold, the first wireless protocol circuitry may determine not to wirelessly transmit first signals, while if the ambient signal strength on the channel is lower than the determined in-band signal strength threshold, the first wireless protocol circuitry may determine to wirelessly transmit first signals.

Thus, the first in-band signal strength threshold may be used when second signals are not being transmitted (or are infrequently being transmitted) by the wireless device, while the second in-band signal strength threshold may be used when second signals are being transmitted (or are frequently being transmitted) by the wireless device. Accordingly, with use of the method according to the embodiments described herein, clear channel assessment may not (or typically will not) incorrectly determine that the assessed channel is not clear due to the presence of ambient energy from second signals in the assessed channel. As a result, the first wireless protocol circuitry may be able to transmit first signals (e.g., via the first antenna) simultaneously with the second wireless protocol circuitry transmitting second signals (e.g., via the second antenna).

BRIEF DESCRIPTION OF THE DRAWINGS

A better understanding of the present invention can be obtained when the following Detailed Description of the Embodiments is read in conjunction with the following drawings, in which:

FIGS. 1A and 1B illustrates exemplary wireless devices, according to one embodiment;

FIG. 2 is a block diagram of an exemplary system supporting multiple wireless protocols for use in a wireless device according to one embodiment;

Figure 3:
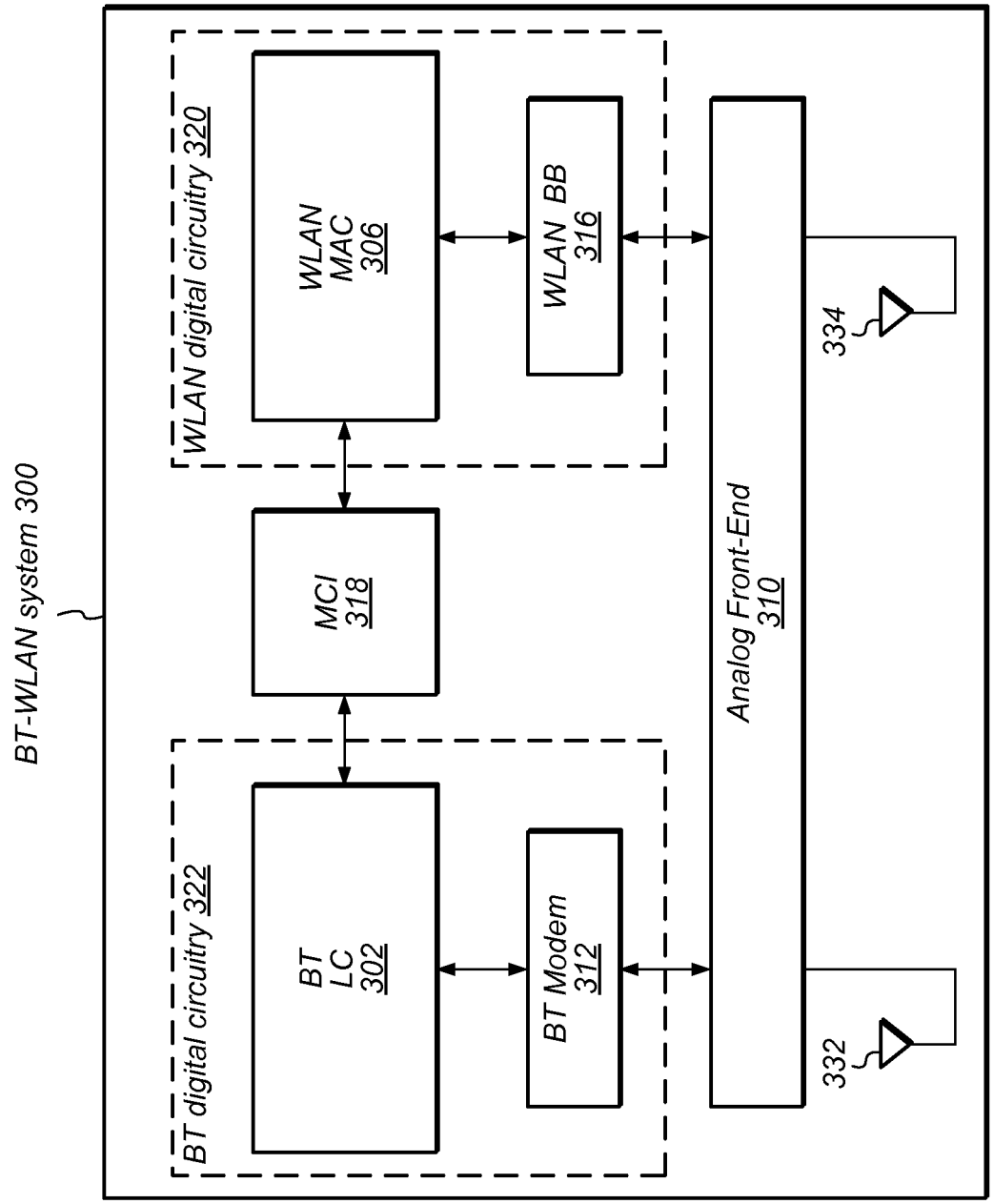
FIG. 3 is a block diagram illustrating a Bluetooth-WLAN implementation of a system supporting multiple wireless protocols for use in a wireless device according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE DISCLOSURE

Glossary

These terms used in the specification are understood to have the following meanings.

The term "channel" as used herein is presumed to have its ordinary accepted meaning, e.g., a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. For example, if used in reference to a WLAN device, the term "channel" would refer to a 22 MHz band defined as a channel by the WLAN protocol, while if used in reference to a Bluetooth device, the term "channel" would refer to a 1 MHz band defined as a channel by the Bluetooth protocol. If used in reference to a device that utilizes a different protocol, the term "channel" would be used according to the definition of the term according to that protocol, or according to an equivalent term according to that protocol if it does not define the term "channel".

The phrases "channel assessment" and "clear channel assessment" refer to a process by which a channel is assessed for clarity, e.g., for suitability for transmission. The process may include comparing a metric (such as energy present in the channel, or another metric) which is indicative of the clarity of the channel with a threshold. For example, if used in reference to the WLAN protocol, the phrase would refer to a process by which an in-band received signal strength indicator (RSSI) is compared with a specified threshold to determine whether any other WLAN devices in the network are currently transmitting, in order to avoid transmitting at a time when it would cause a collision on the channel between transmissions by multiple WLAN devices in the same network. Other equivalent or similar processes performed according to different protocols may also be considered clear channel assessment.

FIGS. 1A-1B—Wireless Devices

FIGS. 1A and 1B illustrate an exemplary wireless device 100, according to one embodiment. As shown in FIG. 1A, the wireless device 100 may be a portable computer or other mobile computing device. Alternatively, as shown in FIG. 1B, the wireless device 100 may be a cell phone or smart phone or other similar mobile device (which may also be classified as a mobile computing device). However, it should be noted that other wireless devices are also envisioned, such as personal digital assistants, multimedia players (portable or stationary), routers, and/or other mobile devices/computing systems which are operable to use wireless communication. It should be understood, accordingly, that the wireless device 100 may, in addition to being configured according to the various embodiments described herein, also be configured to perform a variety of functions typical of such devices.

The wireless device 100 may be configured to perform wireless communication using a first wireless protocol and/or a second wireless protocol. For example, the wireless device 100 may be configured to perform wireless communication using only the first wireless protocol, using only the second wireless protocol, or simultaneously using both the first and second wireless protocol. The first and second wireless protocols may be any type of wireless protocol. In some embodiments, the first wireless protocol may be a wireless local area network (WLAN) protocol. Additionally, the second wireless protocol may be a short range wireless communication protocol, such as Bluetooth. As used herein, a short range wireless protocol may refer to wireless protocols which support distances of up to 1 meter to 10 meters, or in higher powered devices, 100 meters.

The first and second wireless protocols may share a frequency band. For example, WLAN and Bluetooth share the 2.4 GHz range of the ISM radio band. It should be noted that although the first and second wireless protocols may share a frequency band, they may transmit and receive signals on different channels of the frequency band. However, residual energy from transmissions by one wireless protocol may be present on a neighboring channel used by the other wireless protocol. The amount of residual energy may depend on a variety of factors, such as a frequency difference between the channels used by the first and second wireless protocols, a transmission signal strength on the neighboring channel, and a level of isolation between transmission antennas (if multiple antennas are used).

In some situations, this could present a problem. For example, some wireless protocols, such as WLAN, perform a clear channel assessment in order to determine that there is no conflicting traffic (e.g., from other WLAN transmitters in the same network) present on a desired transmission channel. The clear channel assessment, which may include comparing a signal strength or residual energy level present on the desired transmission channel with an in-band signal strength threshold, may be used to determine whether or not a transmission on that channel would be successfully received, or would collide with a transmission by another transmitter (e.g., using the same wireless protocol) on the same channel. However, depending on the value of the in-band signal strength threshold, it is possible that a transmission by another wireless protocol on a neighboring channel (e.g., a transmission by Bluetooth in the case of WLAN) could cause ambient or residual energy in the channel to be higher than the in-band signal strength threshold.

In many cases (Bluetooth and WLAN, as one example), the transmission on the neighboring channel would not actually interfere with reception of signals transmitted by the wireless protocol performing the clear channel assessment. However, if the transmission on the neighboring frequency does cause ambient or residual energy in the channel to be higher than the in-band signal strength threshold, transmission may not be performed on the assessed channel because of the result of the clear channel assessment. In other words, simultaneous transmission by both wireless protocols may not be possible under these circumstances.

Embodiments of the present disclosure relate primarily to a system and method (e.g., for implementation in wireless device 100) for performing clear channel assessment in such a way that simultaneous transmission by multiple wireless protocols is possible. This may be accomplished, according to various embodiments, by dynamically determining the appropriate in-band signal strength threshold. For example, in some embodiments, a first in-band signal strength threshold may be used as a default in-band signal strength threshold, while a second (e.g., higher) in-band signal strength threshold may be used when wireless transmission is occurring on a neighboring channel (e.g., by a second wireless protocol). The following figures and written descriptions thereof illustrate further possible implementation details of such a system and method according to a variety of embodiments.

FIG. 2—Block Diagram of a System Supporting Multiple Wireless Protocols

As shown in FIG. 2, the wireless device 100 may include device circuitry 120 (for performing various functions of the wireless device), first wireless protocol circuitry (or logic) 130, and second wireless protocol circuitry (or logic) 140. The various logic or circuitry described herein may be may be implemented in any of various ways, such as analog logic, digital logic, a processor and memory (such as a CPU, DSP, microcontroller, etc.), an ASIC (application specific integrated circuit), an FPGA (field programmable gate array), or any combination of the above.

The first wireless protocol circuitry 130 may be comprised on a first chip, and the second wireless protocol circuitry 140 may be comprised on a second chip. As used herein, the term "chip" has the full extent of its ordinary meaning, and includes an electronic device, e.g., a semiconductor device, that may be implemented in any of the ways described above for the first wireless protocol circuitry 130 and the second wireless protocol circuitry 140. In other embodiments, the first wireless protocol circuitry 130 and the second wireless protocol circuitry 140 may be on the same chip.

The first and second wireless protocol circuitries 130, 140 may enable the system 100 to transmit and/or receive wireless signals according to multiple wireless protocols. For example, the first wireless protocol circuitry 130 may enable reception, transmission, and processing of signals according to a first wireless protocol, and the second wireless protocol circuitry 140 may enable reception, transmission, and processing of signals according to a second wireless protocol. According to the various embodiments, the first and second wireless protocols themselves may be any type of wireless protocol, albeit proprietary, well-known standard or less well-known standard, such as, without limitation, 802.11 (WLAN), Bluetooth, ZigBee, Wireless USB, RFID, Dedicated Short Range Communications (DSRC), any combination thereof, or any other wireless protocol, as desired. As shown, the first wireless protocol circuitry 130 and the second wireless protocol circuitry 140 may in some embodiments be able to communicate with each other, e.g., using a communication interface.

In one exemplary embodiment, the first wireless protocol circuitry 130 may be WLAN circuitry 130 and the second wireless protocol circuitry 140 may be Bluetooth circuitry 140. The WLAN circuitry 130 and the Bluetooth 140 circuitry may be co-located, e.g., may be located in the same wireless device 100.

According to some embodiments, one or both of the first wireless protocol circuitry 130 and the second wireless protocol circuitry 140 may be implemented in the manner shown in and described with respect to FIG. 3, or a variation thereof. Additionally, in some embodiments one or both of the first wireless protocol circuitry 130 and the second wireless protocol circuitry 140 may be configured to perform clear channel assessment according to an embodiment of the method shown in and described with respect to FIG. 4, or a variation thereof.

FIG. 3—Block Diagram of a wireless device supporting WLAN and Bluetooth

FIG. 3 is a block diagram illustrating an exemplary embodiment of a system supporting multiple wireless protocols for use in a wireless device, in which the wireless protocols are Bluetooth and WLAN. As noted above, the system shown in FIG. 3 (or a variation thereof) may be an implementation of the wireless device 100 shown in FIGS. 1 and 2. However, the system shown in FIG. 3 should be considered a non-limiting exemplary implementation of the wireless device 100; other systems supporting multiple wireless protocols, as well as numerous variations of the system shown in FIG. 3, are also envisioned, and will be apparent to those skilled in the art having the benefit of this disclosure.

The system 300 shown utilizes a combination of digital logic (Bluetooth Link Control (LC) 302, Bluetooth (BT) Modem 312, WLAN Medium Access Control (MAC) 306, WLAN Baseband (BB) 316) and analog front-end 310. In addition, one or both of the WLAN and BT digital portions 320, 322 may further include higher (e.g., software) levels of logic for further processing of signals and/or performing other functions.

The system of FIG. 3 may be implemented with an analog front-end 310 having any of a variety of possible architectures, as desired. For example, although analog front-end 310 is shown as being a single analog front-end for both BT and WLAN, embodiments in which BT and WLAN have separate analog front-ends are also envisioned. Additionally, embodiments are envisioned both in which BT and WLAN share a single antenna (e.g., first antenna 332), and in which BT and WLAN each have their own antenna (e.g., first antenna 332 and second antenna 334). The antenna(s) may be configured to wirelessly transmit and/or receive BT and/or WLAN signals.

According to various embodiments, signals from WLAN and BT which are to be transmitted at the first antenna 332 and/or the second antenna 334 may undergo a variety of processing steps. For example, signals may initially be generated digitally and undergo digital processing (e.g., by WLAN BB 316 or BT modem 312, depending on the type of signals) prior to being passed to analog front end 310. Analog front-end 310 may be configured (e.g., with one or more digital-to-analog converters) to convert the digital signals to analog signals. Analog front-end 310 may further be configured to perform one or more analog processing steps such as gain control (e.g., using one or more gain elements) and upconversion (e.g., using oscillators and/or mixers). Following any such analog processing steps, analog front end 310 may pass the signals to first antenna 332 or second antenna 334 for wireless transmission. Various alternative or additional digital and/or analog components and/or processing steps are also contemplated. Similar steps may be performed in reverse for received signals; for example, received signals might be downconverted to a baseband signal, gain controlled using one or more gain elements, converted to digital signals using an analog-to-digital converter, and processed digitally by digital logic and/or software.

As shown, the system 300 may also include a communication interface, e.g., the Message Coexistence Interface (MCI) 318, with which Bluetooth and WLAN may communicate. Other communication interfaces are also possible. According to one set of embodiments, MCI messages may be passed between BT and WLAN as part of the method for performing clear channel assessment shown in and described with respect to FIG. 4. For example, BT might inform WLAN when transmission is occurring, potentially also indicating transmission strength and frequency, in order that WLAN may adjust an in-band signal strength threshold used in performing clear channel assessment to account for the BT transmission. This may, for example, allow WLAN to transmit simultaneously with BT while still avoiding conflict with other WLAN transmitting devices within its network, e.g., as part of the method of FIG. 4.

Figure 4:
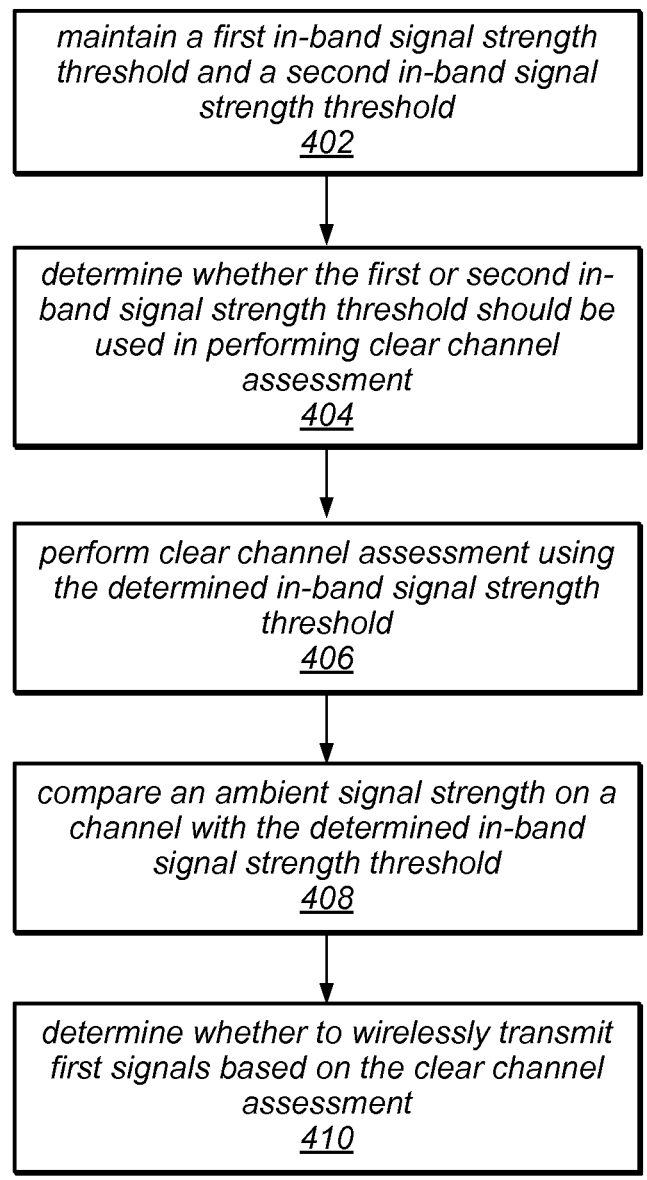
FIG. 4 is a flowchart diagram illustrating embodiments of a method for performing clear channel assessment that supports simultaneous transmission by multiple wireless protocols.

FIG. 4—Flowchart Diagram Illustrating a Method for Clear Channel Assessment that Supports Simultaneous Transmission by Multiple Wireless Protocols FIG. 4 is a flowchart diagram illustrating an embodiment of a method for performing clear channel assessment in a wireless device supporting multiple wireless protocols. The method shown in FIG. 4 may enable first wireless protocol circuitry (e.g., implementing a first wireless protocol) to perform clear channel assessment in such a way that that both the first wireless protocol circuitry and second wireless protocol circuitry (e.g., implementing a second wireless protocol) are able to transmit wireless signals simultaneously. In contrast, without performing the method, transmission of wireless signals according to the second wireless protocol circuitry might cause sufficient ambient or residual signal energy to be present when the first wireless protocol circuitry performs clear channel assessment as to cause the first wireless protocol not to transmit wireless signals.

The method may be implemented by a system for use in a wireless device supporting multiple wireless protocols, such as any of the systems shown in FIGS. 1-3 and described with respect thereto. The wireless device may include the first and second wireless protocol circuitry, which may be configured to generate first and second signals, respectively, for wireless transmission according to first and second wireless protocols, respectively. According to one set of embodiments, a system configured to implement the method might include the entire wireless device. Alternatively, embodiments are envisioned in which the system configured to implement the method represents a portion of the wireless device, e.g., a chip which implements a first wireless protocol circuitry and which is configured for use in the wireless device.

For example, embodiments are contemplated in which the multiple wireless protocol circuitries include first wireless protocol circuitry 130 and second wireless protocol circuitry 140 shown in and described with respect to FIG. 2. In some embodiments (such as might be implemented in the systems shown in FIG. 3 and described above with respect thereto), the wireless protocols may be WLAN and Bluetooth (BT). The wireless protocols may alternatively be other wireless protocols, if desired.

While the steps described below with respect to FIG. 4 are shown in a certain order, it should be noted that, according to various embodiments, one or more of the steps may be omitted, repeated, or performed in a different order than shown.

One or more additional steps may also or alternatively be added, as desired. The method may be performed as follows.

In 402, a first in-band signal strength threshold and a second in-band signal strength threshold may be maintained. The first and second in-band signal strength threshold may also be referred to herein as the first and second thresholds, respectively. One or the other of the first and second in-band signal strength thresholds may be used in performing clear channel assessment, e.g., as will be further described subsequently with respect to steps 406 and 408.

The first and second in-band signal strength thresholds may be maintained by the first wireless protocol circuitry. The first in-band signal strength threshold may be a default threshold. For example, WLAN may implement a default energy threshold of −62 dBm. Other default (first) thresholds are also considered. The first in-band signal strength threshold may be primarily intended for use when little or no residual signal energy is present on the channel to be assessed. The second in-band signal strength threshold, in contrast, may be primarily intended for use in the presence of residual signal energy (e.g., signal energy from sources other than first wireless protocol devices). Accordingly, the second in-band signal strength threshold may be higher than the first in-band signal strength threshold. For example, a Bluetooth transmission at 12 dBm that is on the order of tens of MHz from a WLAN channel may easily cause an in-band energy greater than −62 dBm; thus, the higher second in-band signal strength threshold is maintained for use in such situations.

Maintaining the first and second in-band signal strength thresholds may include storing the first and second in-band signal strength thresholds, e.g., in a memory. For example, in some embodiments, the first and/or second in-band signal strength thresholds may be maintained in hardware registers. For example, WLAN circuitry might include an in-band signal strength threshold in the "bb_timing_control_5_rssi_thr1a" field. Alternatively, or additionally, the first and/or second in-band signal strength thresholds may be maintained in software. In one exemplary implementation, a single hardware register value may be modified by software to be the first or second in-band signal strength threshold (e.g., as determined in the manner described with respect to step 404). Alternatively, the first and second in-band signal strength thresholds may be maintained in first and second hardware registers, respectively, of which a determined register would be used for the determined (e.g., in step 404) in-band signal strength threshold.

In 404 it may be determined whether the first or second in-band signal strength should be used in performing clear channel assessment. The determination may be made by the first wireless protocol circuitry.

The first (e.g., default) threshold may be appropriate if little or no energy from outside the channel leaks into the channel. For example, the first threshold may be appropriate if the second wireless protocol is not transmitting, or is transmitting on a sufficiently distant frequency and/or with a sufficiently low energy, and/or there is sufficient isolation between antennas, such that transmissions by the second wireless protocol do not result in an energy level above the first in-band signal strength threshold.

However, if transmissions by the second wireless protocol would cause an energy level above the first in-band signal strength threshold to be present in the channel, and the second wireless protocol is transmitting, the second threshold may be appropriate. The second threshold may be higher than the first threshold. For example, the second threshold may be high enough to exclude residual signal energy from the second wireless protocol but low enough to detect energy from transmissions according to the first wireless protocol in the channel (e.g., by other devices using the first wireless protocol).

Multiple options for determining whether the first or second threshold should be used in performing clear channel assessment are considered. One straightforward way of determining which threshold is appropriate involves direct communication between the first and second wireless protocol circuitries and a hardware-based response to such communications. For example, in some embodiments, the second wireless protocol circuitry may communicate information regarding when it is transmitting, on which frequency it is transmitting, and/or with what signal strength it is transmitting. The first wireless protocol circuitry may receive this information and use it (possibly in combination with information regarding a level of isolation between antennas on which the first and second wireless protocol circuitries transmit) to determine which threshold to use, and even (in some embodiments) to dynamically modify the second threshold. In some embodiments the response may be in real-time; for example, the determination of which threshold to use may be based (at least in part) on whether or not the second wireless protocol is actually transmitting at any given time.

However, depending on the architecture of the wireless device implementing the method, this may not be possible. For example, a high-speed (e.g., on the order of microseconds) hardware-based response to communications by the second wireless protocol may only be reasonable if the hardware is specifically designed to do so. Accordingly, an alternative implementation utilizing software-based control of the threshold (which may still be stored in a hardware register) is also considered, e.g., for situations in which hardware modification is not justified. In this case, determination of which threshold to use, and potential modifications to the second in-band signal strength threshold, may be performed in software based on empirical measurements (e.g., of how often, on which frequencies, and/or with what signal strength the second wireless protocol is transmitting) on a longer timescale. For example, because the software implementation may not involve as rapid of a response to changing conditions as the hardware implementation, in this case determination of which threshold to use may be based (at least in part) on how frequently the second wireless protocol transmits on average over a period of time.

In 406, clear channel assessment may be performed using the determined in-band signal strength threshold. Clear channel assessment may be performed by the first wireless protocol circuitry. Performing clear channel assessment may include measuring (or receiving information regarding) residual or ambient signal strength on the channel, e.g., an in-band signal strength. For example, WLAN might determine an in-band received signal strength indicator (RSSI) as its measurement of the in-band signal strength.

In 408, residual or ambient signal strength on the channel may be compared with the determined in-band signal strength threshold. Comparing residual or ambient signal strength on the channel with the determined in-band signal strength threshold may also be considered part of clear channel assessment. For example, if the ambient signal strength on the channel is higher than the determined in-band signal strength threshold, the channel may be considered to be in use, e.g., the channel may not be clear. In contrast, if the ambient signal strength on the channel is not higher than the determined in-band signal strength threshold, the channel may be considered to be not in use, e.g., the channel may be clear.

In 410, the first wireless protocol circuitry may determine whether to wirelessly transmit first signals based on the clear channel assessment. If the channel is determined to be in use (not clear), the first wireless protocol circuitry may determine not to wirelessly transmit first signals at that time. However, if the channel is determined to be not in use (clear), the first wireless protocol may determine to wirelessly transmit first signals.

Thus, since the second in-band signal strength threshold will typically be used when the second wireless protocol circuitry is transmitting, the clear channel assessment will typically be capable of accurately determining channel clarity regardless of whether the second wireless protocol circuitry is transmitting. In other words, using the method described herein, the first wireless protocol circuitry may be capable of determining that its channel is clear (e.g., if no other first wireless protocol transmission is occurring on the channel) and transmitting first signals simultaneously with the second wireless protocol circuitry transmitting on a neighboring frequency in the same frequency band.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising: first and second wireless protocol circuitries configured to generate first and second signals, respectively, for wireless transmission according to first and second wireless protocols, respectively; wherein the first wireless protocol circuitry is configured to perform clear channel assessment, and wherein the first wireless protocol circuitry is configured to:
   maintain a first in-band signal strength threshold and a second in-band signal strength threshold;
   determine whether the first or second in-band signal strength threshold should be used in performing the clear channel assessment based at least in part on information regarding transmission operation of the second wireless protocol circuitry; and
   perform clear channel assessment using the determined in-band signal strength threshold.

2. The wireless device of claim 1, wherein performing clear channel assessment comprises comparing an ambient signal strength on a channel with the determined in-band signal strength threshold, wherein the first wireless protocol circuitry is configured to determine whether to wirelessly transmit first signals based on the clear channel assessment.

3. The wireless device of claim 1, wherein determining whether the first or second in-band signal strength threshold should be used in performing the clear channel assessment comprises determining typical signal strengths of first signals and second signals in a channel.

4. The wireless device of claim 1, wherein the first wireless protocol circuitry is further configured to receive an indication that the second wireless protocol circuitry is wirelessly transmitting second signals when the second wireless protocol circuitry is wirelessly transmitting second signals; wherein determining whether the first or second in-band signal strength threshold should be used in performing the clear channel assessment is based on whether the first wireless protocol circuitry receives the indication that the second wireless protocol circuitry is wirelessly transmitting second signals.

5. The wireless device of claim 1, further comprising: an antenna coupled to the first and second wireless protocol circuitries, wherein the antenna is configured to wirelessly transmit the first and second signals.

6. The wireless device of claim 1, further comprising: a first antenna coupled to the first wireless protocol circuitry, wherein the first antenna is configured to wirelessly transmit the first signals; a second antenna coupled to the second wireless protocol circuitry, wherein the second antenna is configured to wirelessly transmit the second signals.

7. The wireless device of claim 6, wherein the second in-band signal strength threshold is based at least in part on a level of isolation between the first antenna and the second antenna.

8. The wireless device of claim 1, wherein the first wireless protocol circuitry is configured to modify the second in-band signal strength threshold based at least in part on a difference between transmission frequencies of the first and second wireless protocol circuitries.

9. The wireless device of claim 1, wherein the first wireless protocol circuitry is configured to modify the second in-band signal strength threshold based at least in part on a transmission strength of second signals by the second wireless protocol circuitry.

10. The wireless device of claim 1, wherein the first wireless protocol circuitry is further configured to: receive a notification of a transmission strength and frequency for second signals being transmitted by the second wireless protocol circuitry; determine the second in-band signal strength threshold based at least in part on the notification of the transmission strength and frequency for second signals being transmitted by the second wireless protocol circuitry.

11. A method for use by a wireless device, wherein the wireless device comprises first and second wireless protocol circuitries configured to generate first and second signals, respectively, for wireless transmission according to first and second wireless protocols, respectively, the method comprising:
   maintaining, by the first wireless protocol circuitry, a first in-band signal strength threshold and a second in-band signal strength threshold;
   determining, by the first wireless protocol circuitry, whether the first or second in-band signal strength threshold should be used in performing clear channel assessment based at least in part on information regarding transmission operation of the second wireless protocol circuitry; and
   performing, by the first wireless protocol circuitry, clear channel assessment using the determined in-band signal strength threshold.

12. The method of claim 11, wherein performing clear channel assessment comprises: comparing an ambient signal strength on a channel with the determined in-band signal strength threshold; wherein the method further comprises determining whether to wirelessly transmit first signals based on the clear channel assessment.

13. The method of claim 11, wherein determining whether the first or second in-band signal strength threshold should be used in performing the clear channel assessment comprises: determining typical signal strengths of first signals and second signals in a channel.

14. The method of claim 11, further comprising: receiving, by the first wireless protocol circuitry, an indication that the second wireless protocol circuitry is wirelessly transmitting second signals; wherein determining whether the first or second in-band signal strength threshold should be used in performing the clear channel assessment is based on whether the first wireless protocol circuitry receives the indication that the second wireless protocol circuitry is wirelessly transmitting second signals.

15. The method of claim 11, wherein the wireless device further comprises: a first antenna coupled to the first wireless protocol circuitry, wherein the first antenna is configured to wirelessly transmit the first signals; and a second antenna coupled to the second wireless protocol circuitry, wherein the second antenna is configured to wirelessly transmit the second signals.

16. The method of claim 15, wherein the second in-band signal strength threshold is based at least in part on a level of isolation between the first antenna and the second antenna.

17. The method of claim 11, further comprising: modifying the second in-band signal strength threshold based at least in part on a difference between transmission frequencies of the first and second wireless protocol circuitries.

18. The method of claim 11, further comprising: modifying the second in-band signal strength threshold based at least in part on a transmission strength of second signals by the second wireless protocol circuitry.

19. The method of claim 11, further comprising: receiving, by the first wireless protocol circuitry, a notification of a transmission strength and frequency for second signals being transmitted by the second wireless protocol circuitry; determining, by the first wireless protocol circuitry, the second in-band signal strength threshold based at least in part on the notification of the transmission strength and frequency for second signals being transmitted by the second wireless protocol circuitry.

20. A chip for use in a wireless device, wherein the chip is configured to generate first signals for wireless transmission according to a first wireless protocol; wherein the wireless device comprises second wireless protocol circuitry configured to generate second signals for wireless transmission according to a second wireless protocol; wherein the chip is configured to perform clear channel assessment and wherein the chip comprises:
    circuitry to maintain a first in-band signal strength threshold and a second in-band signal strength threshold;
    circuitry to determine whether the first or second in-band signal strength threshold should be used in performing the clear channel assessment based at least in part on information regarding transmission operation of the second wireless protocol circuitry; and
    circuitry to perform clear channel assessment using the determined in-band signal strength threshold.

\* \* \* \* \*